May 6, 1969 K. G. HRISHIKESAN 3,442,606
REMOVAL OF FLUORINE FROM ALUMINA BY STEAM
Filed Feb. 7, 1967
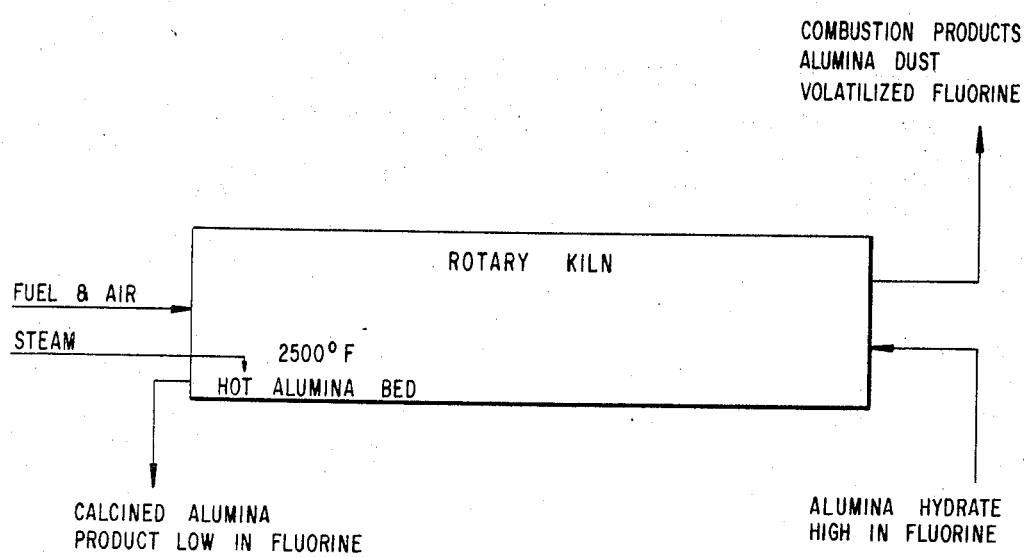
INVENTOR
KIZHAKKE G. HRISHIKESAN
BY Glenn, Palmer & Lyne
ATTORNEYS United States Patent Office 3,442,606
Patented May 6, 1969

3,442,606
REMOVAL OF FLUORINE FROM
ALUMINA BY STEAM
Kizhakke Govind Hrishikesan, Little Rock, Ark., assignor
to Reynolds Metals Company, Richmond, Va., a corporation of Delaware
Filed Feb. 7, 1967, Ser. No. 614,420
Int. Cl. C01f 7/00; B01d 15/06
U.S. Cl. 23—142                                   4 Claims

ABSTRACT OF THE DISCLOSURE

The fluorine content of alumina, particularly ceramic grade alumina, is reduced to as little as 20 parts per million by calcining alumina hydrate in the presence of steam at a temperature above about 2200° F., preferably at about 2500° F. in a rotary kiln.

BACKGROUND OF THE INVENTION

Ceramic grade alumina is of importance in the manufacture of sintered alumina ceramic bodies, such as are found in spark plugs, pump parts, radomes, nose cones, electronic parts, cutting tools, thread guides, and in numerous other applications, in which high mechanical strength, high thermal conductivity, shock and temperature resistance, and good insulating properties are required.

Purchasers of ceramic grade alumina usually specify that the fluorine content of the alumina be less than 80 parts per million, for it appears that amounts in excess of this limit have an adverse effect upon the properties of products of the type described.

In the conventional processing of bauxite type aluminous ores it is found that, depending largely upon the fluorine content of the bauxite, the alumina obtained contains amounts of fluorine considerably greater than the 80 p.p.m. limit, at times as high as 350 p.p.m. fluorine. While fluorine contamination may take place to a minor extent owing to impurities in various processing chemicals, it appears that the principal fluorine source is the bauxite itself. The CaO and F content of various types of bauxite indicate that the fluorine mineral present therein could be calcium fluoride. This is particularly true of domestic bauxites. Thus, typical fluorine contents of various bauxites are:

|  | Percent F |
|---|---|
| Arkansas bauxite | 0.10–0.23 |
| Jamaican bauxite | 0.0392 |
| Berberice bauxite | 0.0892 |

It is known that, by heating alumina to a temperature above about 2700° F., the fluorine level in ceramic alumina can be lowered to about 10 p.p.m. But to achieve this temperature in the hot zone of the alumina kiln requires expensive refractory lining. Moreover, at this temperature, the residual soda in the alumina reacts with the alumina forming large agglomerates which block the cooling grates of the kiln and cause loss of alumina.

SUMMARY OF THE INVENTION

In accordance with the present invention, it has been found that the fluorine content of alumina may be reduced to as little as 20 parts per million by calcining alumina hydrate while injecting steam into the mass of the material at a temperature above about 2200° F., and preferably at about 2500° F. so that the alumina is in intimate contact with the steam so as to cause defluorination. The alumina hydrate may be derived from the treatment of bauxite by the Bayer process.

The defluorination, according to the invention, is believed to be due to the hydrothermal decomposition of calcium fluoride which may be present as a contaminant. This hydrothermal reaction is fairly rapid at 2200° F., but becomes extremely rapid at temperatures above the melting point of $CaF_2$, which is 2490° F. Other fluorides which may be present as impurities in the alumina will also be decomposed in the presence of water vapor. Thus, the melting points of $AlF_3$ (1902° F.), NaF (1812° F.), and cryolite $Na_3AlF_6$ (1832° F.) are well below the minimum treatment temperature of 2200° F. contemplated by the invention.

There is usually sufficient water vapor present in the kiln gases to provide a limited defluorination of the alumina, but defluorination to the desired low level cannot be achieved with this water vapor alone, since the water vapor is not in intimate contact with the hot alumina. By injecting steam into and over the bed of hot alumina, in accordance with the present invention, the water vapor (steam) is brought into the necessary intimate contact with the alumina for defluorination to take place.

Although steam has been suggested as a means of defluorinating phosphate rock and superphosphate, the temperatures employed are somewhat lower, and the treated products still contain about 200 p.p.m. of fluorine. Accordingly, it was surprising and unexpected to find that by the use of steam, the fluorine content of alumina could be reduced to a low figure of only 20 p.p.m.

DESCRIPTION OF THE PREFERRED EMBODIMENTS

In the preferred practice of the invention, alumina hydrate resulting from the extraction of bauxite by the Bayer process is introduced into a rotary kiln. The kiln is direct fired with gas or oil fuel, and the temperature is brought up to about 2500° F. Steam is injected into the kiln at the hot or discharge end, so as to come into intimate contact with the alumina in the kiln. The steam may be injected under the bed or in the grate of the kiln. The combustion products evolved from the kiln include alumina dust and volatilized fluorine. The product is a calcined alumina low in fluorine.

The following example illustrates the practice of the invention, but is not to be regarded as limiting:

EXAMPLE

A gas-fired rotary kiln was operated at a temperature of 2500° F. with a feed of alumina hydrate containing 50 p.p.m. of fluorine. Steam was injected into the body of the calcine with a lance at the hot end of the kiln. The contact time of steam with the hot alumina in the hot zone of the kiln was about 15 minutes. The fluorine content of the calcined alumina was 13 p.p.m. FIG. I shows a sketch of the process.

What is claimed is:
1. Method for the removal of fluorine from fluorine-containing alumina comprising calcining alumina in intimate contact with steam, at a temperature above about 2200° F.
2. The method of claim 1 in which the calcination temperature is about 2500° F.
3. The method of claim 1 in which the alumina to be calcined is alumina hydrate.
4. The method of claim 3 in which the alumina hydrate is Bayer process alumina hydrate.

References Cited

UNITED STATES PATENTS

| 1,036,454 | 8/1912 | Childs | 23—142 |
| 1,405,388 | 2/1922 | Bassett | 23—201 |
| 2,531,046 | 11/1950 | Hollingsworth. | |
| 2,904,519 | 9/1959 | Cornfield et al. | 252—420 |

OSCAR R. VERTIZ, *Primary Examiner.*

G. T. OZAKI, *Assistant Examiner.*

U.S. Cl. X.R.

23—215; 252—420